Dec. 15, 1931.    M. P. WINTHER    1,836,298
POWER TRANSLATOR
Filed Feb. 21, 1929    6 Sheets-Sheet 1

Martin Phillip Winther
Inventor,
Delos T. Haynes
Attorney.

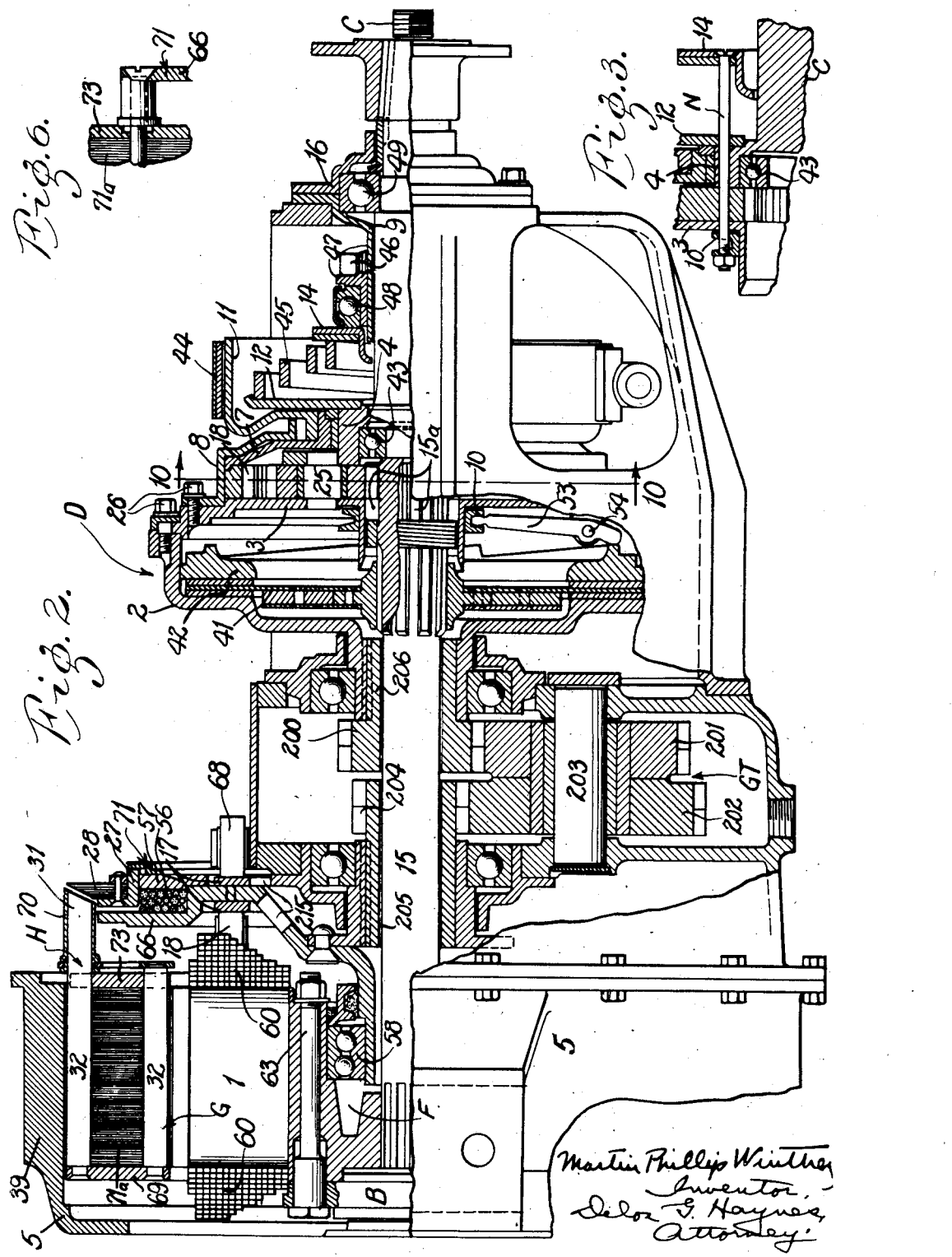

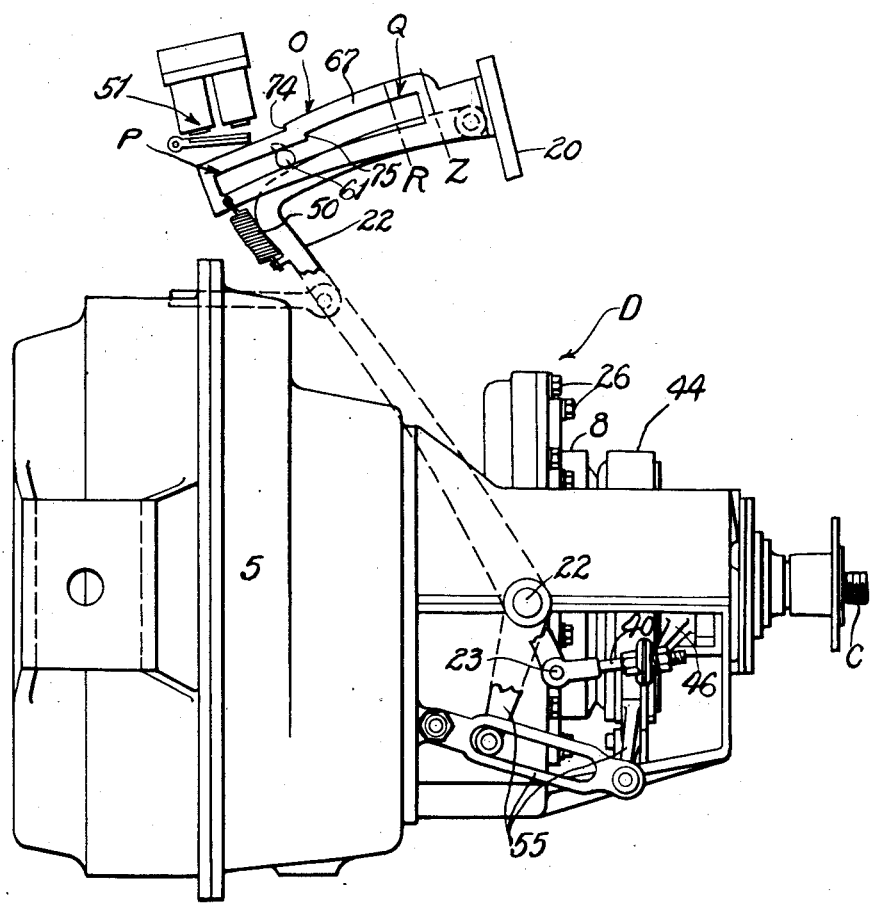

Dec. 15, 1931. M. P. WINTHER 1,836,298
POWER TRANSLATOR
Filed Feb. 21, 1929 6 Sheets-Sheet 4

Martin Phillips Winther
Inventor
Delor G. Haynes
Attorney

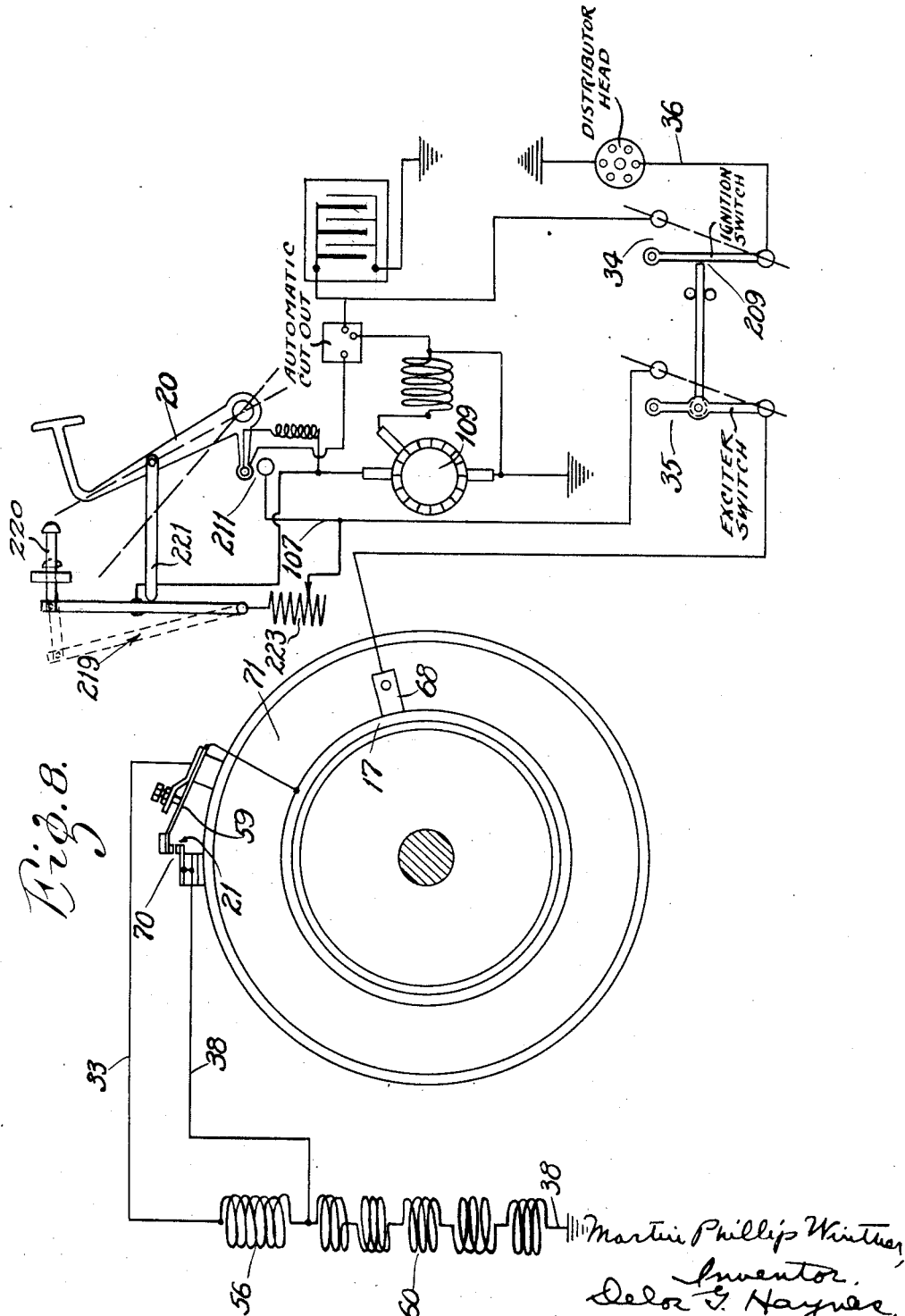

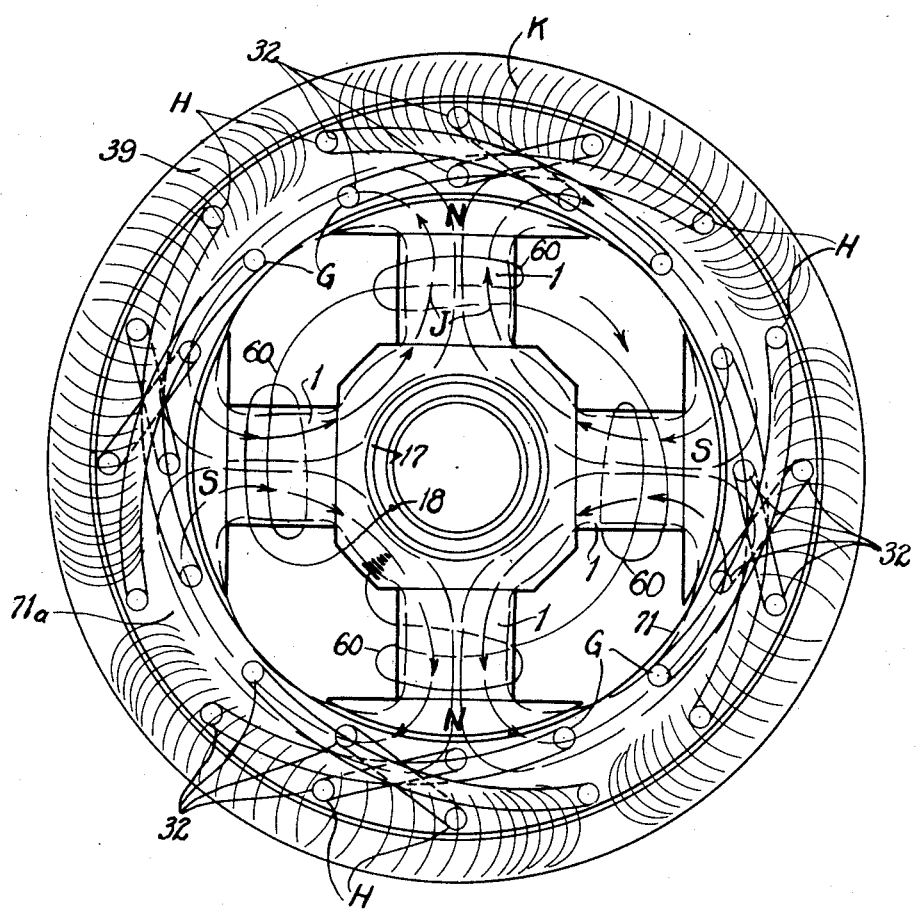

Patented Dec. 15, 1931

1,836,298

UNITED STATES PATENT OFFICE

MARTIN PHILLIP WINTHER, OF CHICAGO, ILLINOIS, ASSIGNOR TO THE WINTHER COMPANY, OF WILMINGTON, DELAWARE, A CORPORATION OF DELAWARE

POWER TRANSLATOR

Application filed February 21, 1929. Serial No. 341,654.

This invention relates to electrical power translators, and with regard to certain more specific features, to an alternating current power translator of improved type for use more especially in motor vehicles and the like, but being applicable also to other purposes.

Among the several objects of the invention may be noted the provision of means for translating power from a prime mover to the driving wheels of a vehicle so as to adapt the limited effective speed-torque range of the former to the unlimited effective speed-torque range imposed on the latter, wherein improved electrical means functioning with alternating current is used, whereby the advantage is had of eliminating sliding contacts for carrying an electrical power circuit; the provision of a device of the class described having a short power circuit with a consequent reduction in weight and losses; the provision of a device of the class described wherein a simplified form of rotor used for driving the propeller shaft is actuated both by engine torque and electrical motor torque; and the provision of a translator of the class described including in combination certain improved dual high speed, direct connecting features, adapted to economize fuel and increase operating speeds.

This device is an improvement in the construction set out in the patent application of Martin Phillip Winther and Anthony Winther, Serial No. 321,071, filed November 22, 1928.

Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings in which is illustrated one of various possible embodiments of the invention, Fig. 1 is a diagrammatic side elevation showing the translator applied to a prime mover;

Fig. 2 is a longitudinal section taken through the translator per se;

Fig. 3 is a fragmentary section showing a clutch release rod detail;

Fig. 4 is a side elevation of the translator on a reduced scale showing certain operating linkages;

Fig. 6 is a fragmentary detail showing a spaced connection between certain members forming a rotor;

Fig. 8 is a wiring diagram;

Fig. 9 is a simplified diagrammatic view of a magnet spider, a rotor and a stator showing electrical and magnetic field action as viewed from the left of Figs. 1 and 2; and, Fig. 10 is a diagrammatic section taken substantially on line 10—10 of Fig. 2, illustrating an epicyclic reversing gear.

Similar reference characters indicate corresponding parts throughout the several views of the drawings.

Figure 1:
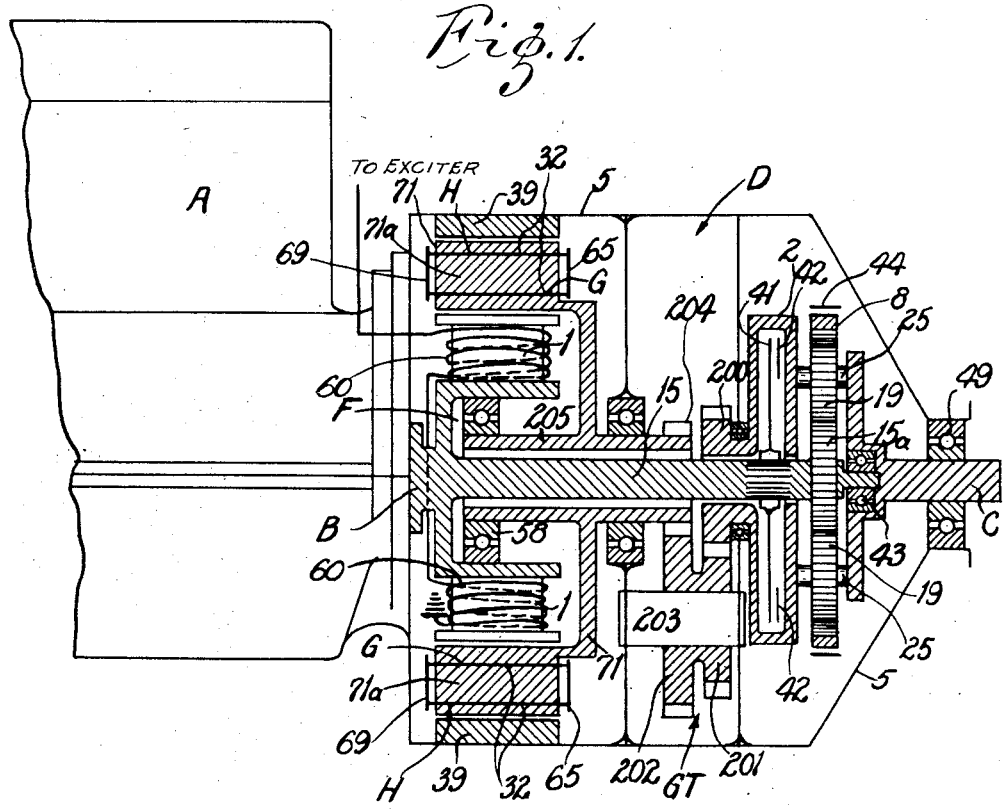

Referring now more particularly to Fig. 1 there is illustrated at A a prime mover such as is ordinarily used in automotive construction, that is, one requiring a change in mechanical advantage between it and the point of power application as an acceleration period is passed over, so as to adapt the speed-torque range of the prime mover to that at the point of application. The power shaft B of this engine is electrically and/or mechanically connected with a propeller shaft C by means of the translator or transmission D, herein to be described.

Broadly, the translator D comprises a multi-pole magnet spider 1 fastened to the power shaft B and directly rotatable therewith, this magnet spider 1 carrying an extension or clutch shaft 15 piloted at bearing 43 in a part of the propeller shaft system C. The clutch shaft 15 has splined thereto a driving male clutch plate 41.

The propeller shaft system C is attached to and rotates with a clutch housing 2. The attachment is made by way of studs 26. The clutch housing 2 carries a gear 200 which meshes with a gear 201, the latter being nested with a gear 202 and rotatable therewith as a unit on a countershaft 203. The gear 202 meshes with a gear 204, said gear 204 being affixed with a sleeve 205. The sleeve 205, by means to be shown, is attached to and rotates with a rotor 71, the latter being piloted with respect to the magnet spider at bearings 58. The rotor 71 is thus geared (by way of gears 204, 202, 201 and 200) to the driven clutch drum 2 and clutch pressure plate 42 movable with said drum. The clutch case 2 and plate 42 form driven female members for releasably gripping the driving male clutch plate 41.

Surrounding the laminations of the rotor 71 is a stator 39 located in a housing 5, the power shaft B being rotatably borne in respect to the housing 5 as is the propeller shaft C.

The above describes the primary interacting features of the invention, namely, the rotatable magnet spider or rotating field member 1, the intermediate rotor 71 and the stator 39, the rotor 71 being geared to and with the female portions of the clutch. There is also an epicyclic reverse gear connection 19 acting between the clutch housing 2, the shafting C and an extension 15 of the rotating field member or spider 1, which connection may be used at will by operation of a certain clutch band 44 to be described more particularly hereinafter. The spider 1 forms a rotating field member for generating alternating current in indicator bars 32 located in the intermediate rotor 71. The inductor bars 32 are arranged in an improved and novel manner (to be particularly described) for producing a rotating field at the outer surface of the intermediate rotor, such that said field rotates in a direction opposite to the rotation of the field of the spider 1. This reverse field during its movement cuts the stator 39, said stator functioning as a motor secondary in the manner also to be particularized. The element 39 forms a secondary for the induced currents in bars 32. It is to be understood that this secondary may, if desired, be of the squirrel cage type, as explained in said prior application, Serial No. 321,071.

Thus it will be seen that a magnetic drag is effected between the spider 1 and rotor 71, whereby the latter tends to be moved in a direction corresponding to the direction in movement of the spider 1. However, the inherent slip between the magnet member 1 and rotor 71 induces current in the inductors 32 and these, by said means to be set out, set up the magnetic field externally of the rotor 71 which moves in a direction reverse to the movement of the field emanating from the spider 1. The result of this external field cutting the stationary ring 39, whereby the movement of the rotor is augmented in the direction that it is already travelling, rather than resisted, as would be the case were the direction of movement of the external field the same as that of the internal or spider field. The magnet member 1 and the inner inductors or windings on the rotor may be referred to as an alternating current generator, whereas the outer inductors or windings and the stator form an alternating current motor.

With the above in mind, the details of the construction will be set out (see Fig. 2).

The magnet spider 1 includes a separately excited field coil 60, brush connected at 18 with connected exciting current collector rings 17, the latter receiving current by way of a separate exciting brush 68 fed from the exciter. Thus the rotating field of the magnet spider is effected. It is to be noted that this is not a field due induction, but is a simple mechanically rotating field.

The spider 1 is bolted to the end flange of the engine crank or power shaft B by means of studs 63. The clutch shaft 15 is splined at the center of spider 1. The inside of the spider 1 is formed as cup F, said cup formation F riding on a centering and pilot bearing 58, the latter permitting relative rotation with respect to the rotor 71.

Figure 5:
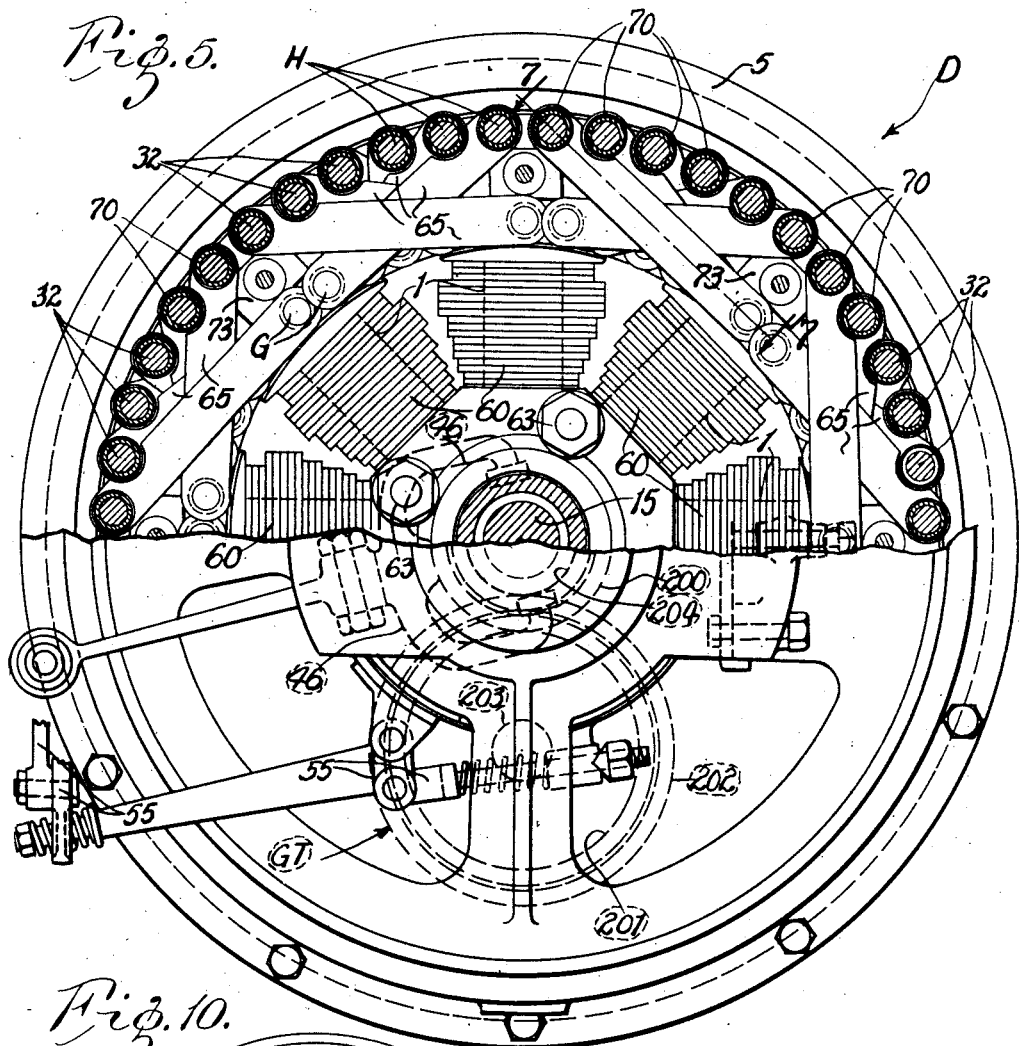
Fig. 5 is an enlarged right-end elevation of Fig. 4, certain portions being broken away and/or eliminated.

The rotor 71 comprises laminations 71a suitably clamped together. A copper end ring 69 is used as a common return for the inductors 32. Each inductor 32 is in effect a U-bar (see also Fig. 7) the open end of which is riveted rearwardly to the common return ring 69. Each leg of each U-bar is straight. The two legs of each U-bar are connected forwardly by a straight riveted conducting connecting link 65. The conducting link is connected directly to the outer bar and held in position by a conducting ferrule 70. Each U-bar is entirely separated at its U-portion from or electrically insulated from its mate. In the present form of the invention there are eight groups of these inductors 32, each group consisting of six inductors arranged as illustrated in Figs. 2, 5 and 6. Each group of inductors or windings on the rotor comprises three pairs of U-bars each pair consisting of a crossed arrangement (see Fig. 5). The exact number of bars in each group is optional and it is not necessary that even numbers be used. The desirable feature is the separated crossed arrangement of the U-bars. The respective pairs of inductors are electrically connected only at and by way of the ring 69 and the respective link 65.

It will be seen that as the magnetic fields of the magnet spider sweep across the innermost circular arrangement G of the legs of the U-bars 32, current is induced in these legs G and that the direction of current flow in the innermost set of legs will be opposite to that in the outermost arrangement H of legs, due to the ring flow in each U-bar and the fact that the outermost set H or legs is not so greatly affected by the moving field, being farther therefrom. Also, the maximum or any other predetermined value of current in each of the inner set of legs G occurs in successive legs in a direction corresponding to the rotation of the magnet spider but, due to the crossed arrangement, it will be seen that the oppositely flowing maximum or other predetermined value of currents in the outer set of legs H takes place in successive legs in a direction opposite to the rotation of the magnet spider, this being due to the crossed arrangements of the U-bars or inductors 32 in their respective groups. These inductors, due to their form and action will be referred to hereinafter as flux rotation reversing bars or windings. For purposes of succinct description, these windings or inductors will also be referred to as X windings. They will be seen to be of the cage type. The successive currents flowing in, successive lengths H induce successive field or flux conditions about said lengths H, which conditions as they change successively advance in a direction opposite to the advance of field conditions due to the magnet spider 1, thus providing the effects above set out.

There are eight poles on the spider 1 in the present embodiment, opposite poles having like polarity and successive peripheral poles having opposite polarity, whereby eight groups of north and south pole combinations are had for inducing current in eight groups of north and south pole combinations of the U-bars 32.

At this stage of the description, the simplified diagram of Fig. 9 may be profitably referred to, in which a four pole magnet spider 1 is shown for simplicity, as well as only four groups of crossed inductor bars 32. It will be seen that opposite magnet spider poles have like polarity and successive ones about the periphery have unlike polarity, this being due to the manner of application of the windings 60. As the spider 1 moves clockwise, reference to the upper north pole indicates that the outward sweep J of magnetic lines cuts the inner group of legs G of the bars 32 and that the successive current values will be induced in these legs flowing away from the reader, the successive values advancing clockwise in successive legs G and at the same time return currents flow toward the reader in the outer row of legs H. However, the successive current values in the outer row of legs H move in a counter-clockwise direction due to the crossed positioning of the inductors.

It is apparent that the upward flow in the outer legs H induces a flux field K, instantaneous values of which are successively moving counter-clockwise so as to cut the motor secondary or stator 39. The stator is homogeneous and therefore of the utmost simplicity.

At the same time an adjacent south pole is inducing opposite effects in the inner row of legs G of the adjacent group of four of the cage bars 32 with consequently opposite progressive effects in the outer row of the adjacent four legs H, the reverse acting field having progressively opposite effects on corresponding elements of the inductor 39. The result is that each of the legs G in succession goes progressively through all values of alternating current flow, both plus and minus and likewise does each leg H, except that the succession progresses in the reverse peripheral direction. Hence the field K has successive values which rotate or progress in the reverse direction to the successive values of the rotating magnet field. As above stated, the reaction between the magnet spider and rotor is that of a magnetic drag, whereby the rotor tends to follow the spider; but the reaction between the rotor and the stator is that of repulsion, whereby the rotor tends further to be forced in the direction of spider movement.

It is to be understood that the same theory set out in regard to Fig. 9 holds in regard to Figs. 1 to 8 and 10, the fewer number of poles being used in Fig. 9 merely to simplify the explanation and incidentally to show that variations may be effected in the number of poles and U-bars used. It should also be clear that the exact number of crossed U-bar inductors used in a matter of choice, depending upon the smoothness of drag and repulsive action desired.

Figure 7:
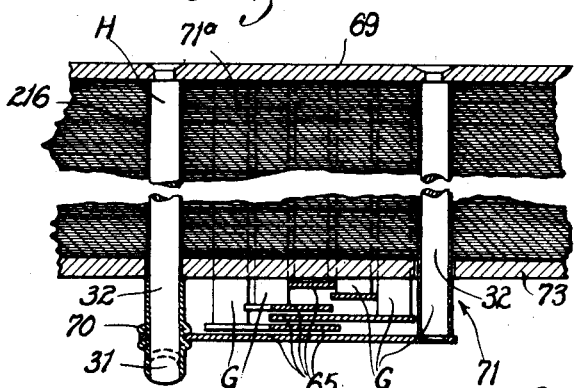
Fig. 7 is a section showing the appearance of a number of U-bars, the section being taken on line 7—7 of Fig. 5.

Reference to Fig. 7 will show that the rotor inductors 32 are surrounded by insulating mica 216 or the like for insulating them from the laminations.

Referring again to the rotor 71 (Figs. 2 and 6), it will be seen that the plate 73 supporting the laminations 71a is fastened to the rotor hub 66, which is supported in the bearing 58 and carries rings 17. This hub or drum 66 is fastened to the herringbone pinion 204 by way of a sleeve connection 205. As described in connection with Fig. 1, the gear 204 is positioned in the reverted train of gears 204, 202, 201 and 200, all of them being the herringbone type. By reverted is meant that the first and last gears of the train are on the same center line. The last gear 200 is connected by a suitable sleeve 206 with the clutch drum 2. Said shaft 15 associated with the magnet spider 1 passes through the aligned hollow sleeves and gears 204, 205, 200 and 206, and passes into the clutch housing 2 where it is splined with the male clutch plate 41 and piloted in bearing 43. On the end of the shaft 15 is located a pinion 15a.

Within the drum 2 is located the clutch pressure plate 42 adapted to be pressed into frictional engagement and clamped position in respect to the clutch plate 41 which is splined to the clutch shaft 15. Operation of the pressure plate 42 is effected by clutch levers 53, pivoted at pins 54 (three used in the present embodiment), said levers having their operating ends engaging with a grooved collar 10 slidably arranged on an extension of the plate 3.

As indicated in Fig. 3, the collar 10 is provided with extension studs N which pass through the plate 3 and a portion of a flange 4 of the driven shaft C. Forwardly these studs N engage with a ferrule 14 which is normally pressed to the right by a clutch spring 45, said spring reacting against the plate 12 fastened to and rotatable with the flange 4. The ferrule 14, and consequently the ring 10 may be moved backwardly against the closing action of the spring 45, this being accomplished by the oscillating action of the clutch operating yoke 46 on a collar 47, a bearing 48 being interposed between the collar 47 and the ferrule 14 for permitting free relative rotation. The collar rides on an extension of a rear bearing retainer 9, the latter having a cap 16 for supporting the driven shaft C upon bearing 49.

From the above it will be seen that the rotor 71 may be driven electrically from the magnet spider 1 and that the rotor may transmit its resulting torque when the clutch is open by way of the gear train. Said train will be referred to hereinafter by the indicia GT. The gear train GT then drives the free clutch casing 2.

Within the reverse gear box cover 8 is rotatably mounted an internal gear 18 fastened to a gear plate 7, the latter in turn being fastened to a reverse operating drum 11. It is apparent that if no resistance is applied to the drum 11 that the internal gear 18 will rotate with the cover 8 but when the drum 11 is held stationary, such as by the frictional application of a reverse band 44, that said internal gear will be held stationary relatively to the rotating parts.

Figure 10:
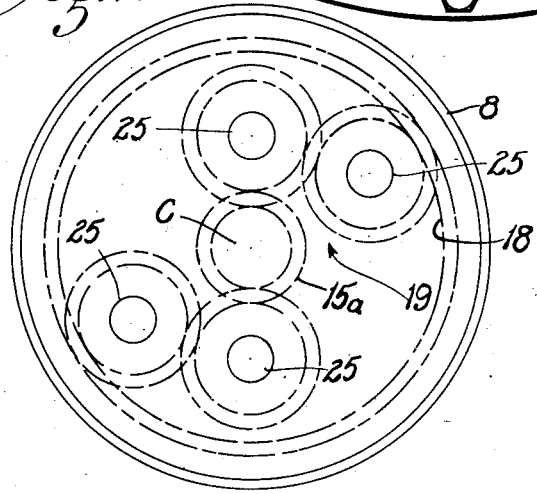

Referring to Figs. 2 and 10, it will be seen that the studs 25 carry meshed pairs of idling pinions or reverse gears 19, one of each pair meshing with the reverse gear pinion 15a and the other meshing with the internal gear 18. As long as the drum 11 is free, there is no relative rotation between the gears 15a, 19 and 18, said group rotating as an integral mass. When the band 44 is frictionally applied to the drum 11, the annular gear 18 is constrained to remain stationary, whereupon the pinion 15a drives the pinions 19 to rotate on their own axis so that the outer pinions act epicyclically and move along the periphery of the internal gear 18, this movement being in an angular direction reverse to the angular direction of movement of the pinion 15a. This results in the studs 25 being forced around in the reverse direction, thereby carrying the whole clutch housing 2 backwards and therefore incidentally driving the rotor 71 backwards by action through the gear train GT.

It is apparent that means should be provided for coordinating the clutching and reverse operations such that there is no interference. The method used is illustrated more particularly in Figs. 4 and 5, wherein a pedal 20 is shown pivoted to a lever arm 22 and resiliently held thereto by a spring 50, the lever arm 22 also being pivoted and engaging at 23 with a linkage 40 for operating the yoke 46, so that the clutch may be opened and closed. The operation is such that when the pedal is permitted to move to the right (Fig. 4) under the action of the clutch spring 45, then the clutch is closed, as is usual in clutch operation. This calls for driving from the spider 1, through shaft 15, closed clutch, idle reverse gear, to the driven shaft system C.

The pedal 20 has a yoke 67 formed integral therewith to which the spring 50 is fastened and which is notched at 74 and 75.

A magnetically operated latch is provided as shown at numeral 51 for preventing the pedal from being normally depressed far enough so that the reverse friction band 44 engages the drum 11. This magnetic latch is operated from a switch on the steering column (or the latch may be mechanically operated) and when in clearing position permits the pedal to be depressed far enough, not only to open the clutch but also to apply the friction band, application of the friction band being effected by way of linkage 55.

When the pedal is depressed so that a fixed stop 61 is relatively to yoke 67 at point O, the machine is prepared for forward electrical drive. The stop 61 is in notch 75. Inadvertent reversal will not occur, because the latch 51 engages notch 74 and it requires another manual operation of the control for latch 51 before reversal can be effected. Electrical drive can be continued without attention from the operator, the notch 75 being hooked over the stop 61.

When the pedal is let back or up, so that the stop 61 is relatively to yoke 67 at position P, then the electrical drive is rendered inoperative, there being no relative motion of the rotating parts, the clutch being closed or engaged to provide a direct mechanical drive.

To effect reverse operation the circuit for the latch 51 is closed, thereby clearing it from the notch 74, after which the pedal may be depressed entirely so that the stop is positioned at Q relatively to the yoke 67.

It will be seen that the vehicle as a whole may be rocked under its own power and oscillations thereof backward and forward synchronized readily by moving the clutch pedal mechanism alternately between forward electrical drive and reverse drive positions. This feature of operation is desirable in maneuvering the vehicle out of difficult situations such as in mud holes and snow drifts.

Referring to Figs. 2 and 7 there may be noted at numerals 31 certain extensions associated with, each of the outer portions H of the generator inductors 32 for short circuiting purposes and adapted to be engaged by a circular brush 28 supported on a movable circular ring 27. The brush 28 is composed of thin riveted circular sheets of copper which are engageable with the angularly machined ends of the extensions 31. The circular brush as a whole, including the body 27 is slidably mounted for longitudinal movement on an extension 57 of the member 66. A circular brush coil 56 is placed between the members 66 and 57 in such position with respect to the brush 28 that when the coil 56 is energized it will draw said brush 28 into contact with the extensions 31 so as to short circuit the X windings and prevent the formation of the traveling field. The purpose of this construction is to bring the slip between the engine and propeller shaft to near mechanical synchronism. The short circuiting cuts out operation as a motor, thereby reducing the net torque to that had by drag only.

In Fig. 8 is shown a wiring diagram and a method for effecting short circuiting. Short circuiting is to take effect at about ten to fifteen miles per hour of velocity for the vehicle. This diagram also shows means for preventing excessive heating at the initial contact point of the brush 28 as it is drawn against the extensions 31.

Referring to said Fig. 8 by numerals, there is again illustrated at 71 the rotor including its brush rings 17 and brush 68. Mounted on the rotor 71 are contacts 21 (not shown in Fig. 2 for simplicity) which are normally in closed circuit when the rotor is stationary, because of the action of the springs 59, that is, when the driven member 71 is stationary the ferruled contacts 70 are closed, thereby cutting out of circuit the brush coil 56 which is connected across the points as shown. The field coil 60 is connected in series with the brush coil 56 and also in series with said ferruled contacts 70. Hence when the rotor 71 is stationary and the ferruled contacts 70 are closed, exciting current follows wire 38 through exciting coils 60 to ground, thereby providing full field flux. After a predetermined speed of the rotor 71 is reached, centrifugal force opens the ferruled contacts 70. Then the exciting current follows wire 33 through both the brush coil 56 and field coil 60 in series. The sudden interposition in circuit of the brush coil 56 decreases the exciting current appreciably, due to the self induction of the brush coil 56 and also the resistance thereof. The short circuit brush 28 is then quickly drawn into contact by the magnetic action of coil 56 before the current in the circuit 33, 56, 60 assumes full intensity. Hence there is no heating, because the current in the inductors 32 is then low. It has been found that it takes only five per cent or so of the maximum current through the brush coil 56 in order to completely and instantaneously close the short circuiting brush 28. This weak five per cent current passing through the field coils 60 is not enough to effect a powerful field. Hence induced current in the windings 32 is low. After the brush 28 is shut the current builds up to one hundred per cent value as the self inductance of the brush coil disappears. Then maximum current flows through the inductors 32 and the brush 28 is positively held shut with a high mechanical tension.

It has been found that the brush 28 does not cause sparking when it goes out of contact, evidently because the current finds a more ready path over the outer portions H of the bars 32. This is because the reactance of the bars H is practically absent when no current is flowing through them. It takes several frequency changes before the reactance is built up, but by that time the brush circuit has been broken. In Fig. 8 at the right is shown a circuit control diagram which includes connections with the pedal 20. As a safety measure the ignition switch 34 is mechanically interlocked with the switch 35. It will be seen that the switch 34 is located in the ignition circuit 36 and that the switch 35 is in the circuit 107 connecting the exciter brush 68 with the battery charging generator 109. Therefore opening of the ignition switch when shutting off the engine also opens the exciter switch 35 so as to prevent translator excitation. However, when starting the engine, the act of closing the ignition switch does not necessarily close the translator exciting circuit switch, because the connection at numeral 209 is by abutment only. Hence the driver can race the engine until it is warmed up as is customary in cold weather, without moving the car. The translator switch can be opened and closed independently of the ignition switch but the ignition switch cannot be left open when the exciter switch is closed.

Another feature shown in Fig. 8 is the electrical switch 211 associated with the pedal 20, which switch 211 is adapted to close when the pedal is thrown into electrical driving position and automatically opens when the pedal returns to direct drive or clutch closed position.

From the above description it is clear that the translator includes the alternating current generator comprising the rotating magnet spider 1 and the internal row G of inductors 32. It also includes the alternating current electric motor element comprising the external row H of inductor bars 32 taken with the stator. The magnet spider forms a rotating generator field. It is to be understood that any of the inductor bars may be referred to as windings and that the windings of the rotor (the U-bars) form a motor primary circuit as well as part of the generator secondary circuit, that is, they comprise a power circuit between the generator and motor inductors. This circuit is permanently closed without sliding contacts or connections.

The following remarks will aid in understanding this device:

The current generated is alternating, the use of alternating current having the advantage of eliminating sliding contacts for carrying the power circuit. The relative motion between the magnet spider and rotor generates current for motorizing and at the same time effects drag, the drag effect and the motorizing effect being additive.

The regulation of the torque between the magnet spider 1 and the rotor 71 is inherent and may be controlled to give a desired effect by proper design. The resistances and reactances of the circuit should be so designed that the current and active flux values in the rotor bars and magnet spider respectively multiply out to give the same product at any given normal operating speed.

Shortly stated, the machine comprises a polyphase alternating current generator and a polyphase alternating current motor built integrally in such a manner that the circuits between the generator inductors and the motor primary are always closed and require no collecting rings or sliding contacts. Also, where the slip between two generating elements produces nearly engine torque for use in driving the driven shaft, it in addition produces an alternating current for use in providing additional torque at the driven shaft.

The present invention not only provides an automatic transmission for motor vehicles giving the advantages of electric drives for acceleration and hill climbing and direct drive for free running but also what is known as two top "speeds" which are quiet enough for free running conditions, one of these speeds operating electrically and the other mechanically.

It has been recognized that much greater fuel economy could be obtained if the so-called high gear in three speed motor vehicle transmissions could be successfully and satisfactorily operated at a gear reduction which would lower the speed of the prime mover. Lowering the speed of the prime mover in relation to the axle speed in modern cars provides a quieter running car but acceleration and hill climbing ability in so-called "high" is reduced directly in proportion to the ratio drop. In gear change boxes of either the three or four speed types this means frequent gear shifting which has always been objectionable.

With the present invention many advantages accrue. When the clutch pedal is back in "clutch closed" position the highest speed or "first high" is had for direct drive. The engine under these conditions runs slower for a given vehicle speed than the engines used with the ordinary three speed forward transmissions, the rear axle ratio having been reduced of the order of from 4.7 : 1.0 to 4.0 : 1.0. This decrease in axle reduction economizes fuel on an average of fifteen per cent or more.

Next by pushing in the pedal 20 to "electric drive" position the "second high" speed is effected. By means of this invention no shifting of gears is necessary when changing from this upper "first high" speed to the lower "second high" speed, as was the case in prior four speed transmissions. In these previous four speed transmissions descending shifts were difficult to make. Furthermore, the lower or "second high" speed was noisier than "first high". With the present invention no gears are shifted and the lower "second high" speed is not noisy because herringbone gears as used and can be used because the gears need never be slid apart as was the case in prior three or four speed gear transmissions. It would be impossible to use herringbone gears in old style four speed transmissions because these gears cannot be slid apart without changing center distances. The ratio from engine to driving wheels in lower "second high" speed in the case of this invention is of the order of 6 to 1, whereas the second speed in a three speed transmission was about 8 to 1 and very noisy. "Second high" in four speed transmissions was also somewhat noisy. "Second high" in the case of this invention is very quiet because it involves electrical driving.

Below the upper "first high" and lower "second high" speeds in previous four speed gear transmissions there were what were known as second speed and first speed giving ratios respectively of about 8½ to 1 and 12 to 1. They were noisy as were the first and second speeds of the three speed transmissions. In the case of the present invention the improvement over these first and second speeds is the quiet electrical operation with high starting torque (before the brush 28 short circuits wherein both magnetic drag and magnetic reaction are used) giving the equivalent of the gear ratio of 12 to 1 and an infinite number of descending ratios automatically effective with increase in car speed.

With all its universality the operation is extremely simple. When the clutch pedal is back the clutch is closed and the highest speed or "first high" is had. When the clutch pedal is depressed the clutch is released and the electric exciting circuit of the translator is closed. If the vehicle speed is above about ten or fifteen miles per hour the translator is automatically in "second high", that is, the engine torque is not augmented by any electrical reaction with the stator 39, inasmuch as the U-bars 32 are short circuited. If however, the vehicle goes below ten to fifteen miles per hour when the clutch pedal is depressed or at any speed for which the short circuiting brush 28 has been set to open by means of suitable springs, then the translator is automatically in its torque increasing position with an infinite number of effective gear ratios.

It may also be noted that this invention effects a weight reduction. The lowest weight in pounds per horse power in previous gas-electric drives has been twenty and has often been greater. In this device the weight has been reduced to about 1½ pounds per horse power, which is equal to that of the otherwise inferior mechanical transmissions. Also, the present device is no larger than a mechanical transmission.

By reference to Figs. 2 and 6 it will be seen that an improved air circulating and cooling system is effected for the translator. Openings 215 permit entry of air around the inside of the field coil 60 which, due to centrifugal action, is thrown outwardly and escapes between the spaced plate or spider 66 and rotor 71.

Another advantage of this invention is that electrical braking may be effected in going down hills and the like. In order to do this (see Fig. 8) there is provided a manually operable switch 219 which shunts the pedal switch 211. It will be seen that if the car is rolling down a hill with the clutch closed, that is, in mechanical drive, "first high," that there will be relative motion between the rotor 71 and the armature 1. Inasmuch as switch 219 is closed and consequently excitation of the magnet starter or armature 1 allowed, an electrical braking effect is had when energy flows from the driven shaft system C to the outer clutch member 2 and through the gear drive 200, 201, 202 and 204. Inasmuch as the clutch is closed, some of this energy is shunted along the splined shaft of the magnet spider 1. The resulting electrical reaction between the magnet spider effects the braking without putting torque on the engine shaft. This energy comes from the momentum of the car.

In order that the switch 219 may not be in closed position when the pedal 20 is in electrical driving position, there is provided an abutting pedal rod 221 which is adapted to open the switch 219 during electrical forward driving connection.

The arrangement is such that when the pedal 20 is in direct mechanical or high speed connection, then it is possible to close the switch 219 by means of a manual reset 220, in order to effect braking. It is desirable to open the switch 219 whenever the pedal 20 is put into electrical driving arrangement, because otherwise the driver may forget to open the switch 219. If he forgets to open this switch and lets the pedal 20 back again he may have a braking action which he does not at that instant desire. With the present construction when the pedal 20 again comes back into direct drive connection, the driver will automatically have eliminated any braking action which he may not desire. If he again desires braking action, he may re-close the switch 219 by means of the manual reset 220.

A limiting resistance 223 is put into this shunted circuit of switch 219 for braking, in order that a desirable braking effect may be had.

It will be seen that as acceleration down a hill proceeds, that excitation of the magnet starter 1 increases due to increasing speed of the exciter which is coupled to rotate from the prime mover and also that relative movement between the starter and the rotor increases so that the braking effect is increased. Therefore, a condition is reached in which there will be struck a balancing speed on any given grade, provided no slipping takes place at the contact with the road. This speed may be governed by the operator by controlling the resistance 223 which is adjustable as shown.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The power translator comprising a field member connected to a prime mover, a rotor acted upon by said field member electrically to provide electrical operation, a stator adapted to effect increased effort on the rotor during electrical operation, a clutch having driven and driving members, a geared connection between the rotor and the driven member of said clutch, a direct connection between the field member and the driving member of said clutch and means for preventing said increased stator effort above predetermined speeds of the clutch member during electrical driving conditions.

2. The power translator comprising a field member connected to a prime mover, a rotor acted upon by said field member electrically to provide electrical operation, a clutch having driven and driving members, a geared connection between the rotor and the driven member of said clutch, a direct connection between the field member and the driving member of said clutch, coordinated means for opening the clutch and effecting electrical operation or closing the clutch and preventing said electrical operation.

3. The power translator comprising a field member connected to a prime mover, a rotor acted upon by said field member electrically to provide electrical operation, a clutch having driven and driving members, a geared connection between the rotor and the driven member of said clutch, a direct connection between the field member and the driving member of said clutch, coordinated means for opening the clutch and effecting electrical operation or closing the clutch and preventing said electrical operation and means for changing the torque effected by electrical operation substantially at a predetermined speed of said driven member of the clutch.

4. A translator comprising a field member, a rotor electrically cooperating therewith for effecting electrical drive, a clutch having driving and driven elements, an operating connection between the rotor and one element of the clutch and an operative connection between the field member and the other element of the clutch, said connections when the clutch is closed causing relative movement between the field member and rotor, an electrical circuit adapted to permit under optimum conditions electrical braking action due to said relative movement when the clutch is closed, said circuit effecting electrical driving action when the clutch is open, means for opening and closing the clutch, a switch in said circuit adapted to automatically break the circuit when the clutch is closed and a second switch cooperating with said clutch operating means such that it is automatically opened when the clutch is opened which is adapted to be manually closed when the clutch is closed.

5. A translator comprising a field member, a rotor electrically cooperating therewith for effecting electrical drive, a clutch having driving and driven elements, an operating connection between the rotor and one element of the clutch and an operative connection between the field member and the other element of the clutch, said connections when the clutch is closed causing relative movement between the field member and rotor, an electrical circuit adapted to permit under optimum conditions electrical braking action due to said relative movement when the clutch is closed, said circuit effecting electrical driving action when the clutch is open and means for positively preventing said optimum braking conditions when the clutch is opened.

6. A power translator comprising an electrical drive including a rotating field member, a stator, a rotor cooperating electrically therewith to be driven thereby, a clutch having driving and driven members, a geared connection between the rotor and one member of the clutch, a direct connection between the field member and the other member of said clutch, a driven shaft, an epicyclic gear connection between the clutch, the field member and the driven shaft and control means for the epicyclic train which operates to cause reversal on a part independent of the clutch.

7. A power translator comprising a rotating field member, a rotor adapted to be electrically driven thereby, a clutch having driving and driven members, mechanical connections between the field member and the rotor on one hand and clutch members respectively on the other hand, a driven shaft, a direct connection between said driven shaft and one of said clutch members forming the arm of an epicyclic train, at least one pinion on the arm geared with the other member of the clutch and the field member and means for controlling the pinion to cause reversal.

8. A power translator comprising a rotating field member, a rotor adapted to be electrically driven thereby, a clutch having driving and driven members, mechanical connections between the field member and the rotor on one hand and clutch members respectively on the other hand, a driven shaft, an epicyclic gear train between the members of the clutch and the driven shaft and means associated with said epicyclic train adapted to cause it to effect reversal.

9. A power translator comprising a rotating field member, a rotor adapted to be electrically driven thereby, a clutch having driving and driven members, mechanical connections between the field member and the rotor on one hand and clutch members respectively on the other hand, a driven shaft, reduction gearing in one of said connections, an epicyclic gear train between the members of the clutch and the driven shaft and means associated with said epicyclic train adapted to cause it to effect reversal, the reversing operation of the epicyclic gears and the driving operation of said clutch and reduction gears being independent.

In testimony whereof, I have signed my name to this specification this 17th day of February, 1929.

MARTIN PHILLIP WINTHER.